United States Patent [19]

Nakamura et al.

[11] 4,301,223
[45] Nov. 17, 1981

[54] METHOD OF STABILIZING ORGANIC SUBSTRATE MATERIALS TO LIGHT

[75] Inventors: Kotaro Nakamura; Yoshiaki Suzuki; Hiroshi Hara; Satoru Sawada; Shigeru Oono, all of Minami-ashigara, Japan

[73] Assignee: Fuji Photo Film Co., Ltd., Minami-ashigara, Japan

[21] Appl. No.: 151,081

[22] Filed: May 19, 1980

[30] Foreign Application Priority Data

May 17, 1979 [JP] Japan ................... 54-60728

[51] Int. Cl.³ .............................................. G03C 7/00
[52] U.S. Cl. ...................... 430/17; 430/216; 430/372; 430/517; 430/512; 430/551; 430/559; 430/933; 8/550; 260/45.75 R; 260/429 R
[58] Field of Search ............... 430/17, 216, 372, 551, 430/933, 512; 260/429 R, 429 J, 438.1, 439 R

[56] References Cited

U.S. PATENT DOCUMENTS

| | | | |
|---|---|---|---|
| 3,178,285 | 4/1965 | Anderau et al. | 430/512 |
| 3,762,922 | 10/1973 | Logosy et al. | 430/372 |
| 3,843,367 | 10/1974 | Schranz et al. | 430/372 |
| 4,042,394 | 8/1977 | Smith et al. | 430/372 |
| 4,050,938 | 9/1977 | Smith et al. | 430/554 |

OTHER PUBLICATIONS

Briggs et al., J. of Appl. Polymer Science, vol. 12, pp. 1825–1833, (1968).
Carlsson et al., J. of Appl. Polymer Science, vol. 16, pp. 615–626, (1972).

Primary Examiner—J. Travis Brown
Attorney, Agent, or Firm—Sughrue, Mion, Zinn, Macpeak and Seas

[57] ABSTRACT

A method is described for stabilizing organic substrate materials having an absorption maximum in the range of from about 300 nm to 800 nm to light which comprises making at least one complex represented by the formula (I) coexist with the organic substrate materials in an amount effective to stabilize said organic substrate material:

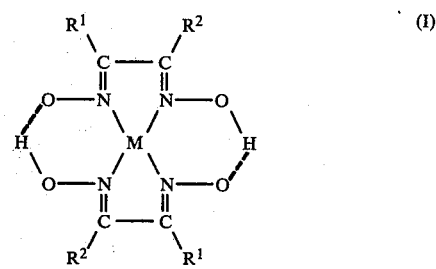

wherein M represents copper, cobalt, nickel, palladium or platinum, and $R^1$ and $R^2$ independently represent a hydrogen atom, an alkyl group, an aryl group, an acyl group, an N-alkylcarbamoyl group, an N-arylcarbamoyl group, or an N-alkylsulfamoyl group, an N-arylsulfamoyl group, an alkoxycarbonyl group or an aryloxycarbonyl group.

8 Claims, No Drawings

METHOD OF STABILIZING ORGANIC SUBSTRATE MATERIALS TO LIGHT

BACKGROUND OF THE INVENTION

1. Field of the Invention

The present invention relates to stabilizing organic substrate materials and, more particularly, to stabilizing organic dyes and particularly photographic dye images to light.

2. Description of the Prior Art

In general, it is widely known that organic substrate materials, for example, organic dyes tend to fade or discolor by the action of light and in the fields of inks, textile dyeing color photography, etc., means of improving the light fastness of organic dyes, preventing fading or discoloring of such organic dyes, etc., have been investigated. Many methods for reducing the occurence of fading or discoloring or increasing the light fastness of these organic substrate materials have been reported. For example, U.S. Pat. No. 3,432,300 discloses that the resistance or stabilization of organic compounds such as indophenol dyes, indoaniline dyes, azo dyes, and azomethine dyes to visible light and ultra-violet rays is improved by mixing them with a phenol type compound having fused heterocyclic ring.

Generally, in the field of silver halide photographic materials, various methods are known for improving the stability of color images, that is, the images of dyes such as azomethine dyes or indoaniline dyes formed by the reaction of the oxidation product of an aromatic primary amine color developing agent and couplers as described in C. E. K. Mees and T. H. James; *The Theory of the Photographic Process;* Chapter 17, published in 1967 by Macmillan Co. For example, there are the hydroquinone derivatives described in U.S. Pat. Nos. 2,360,290; 2,418,613; 2,675,314; 2,701,197; 2,704,713; 2,728,659; 2,732,300; 2,735,765; 2,710,801; and 2,816,028; and U.K. Pat. No. 1,363,921, the gallic acid derivatives described in U.S. Pat. Nos. 3,457,079 and 3,069,262 and Japanese Patent Publication No. 13,496/'68, the p-alkoxyphenols described in U.S. Pat. Nos. 2,735,765 and 3,698,909, and the derivatives such as chroman and cumarin described in U.S. Pat. Nos. 3,432,300; 3,573,050; 3,574,627; 3,764,337; 3,574,626; 3,698,909 and 4,015,990. However, these compounds have an effect as a fading preventing agent or discoloring preventing agent for color images but the effect is insufficient.

Also, a method for improving the stability of organic compounds to light by using an azomethine quenching compound of which the absorption maximum is at a longer wavelength than the absorption maximum of the substrate material is described in U.K. Pat. No. 1,451,000 or U.S. Pat. No. 4,050,938 to Smith Jr. et al. However, since the azomethine quenching compound itself has deep color, the use of such a compound is disadvantageous in the point that it influences greatly on the color hue of the substrate material. In more detail, the chelated metal quenching compound of Smith Jr. et al seriously reduces the sensitivity of a photographic system and this is a substantial defect in the use of such a component in a photographic system.

Also, the use of metal complexes for the prevention of light deterioration of polymers is described by J. P. Guillory and R. S. Becker in *Journal of Polymer Science, Polym. Chem. Ed.,* 12, 993(1974) and by R. P. R. Ranaweera and G. Scott in *Journal of Polymer Science, Polym. Lett., Ed.,* 13, 71(1975) and further a method of stabilizing dyes by metal complexes is described in Japanese Patent Application (OPI) No. 87,649/'75 and "Research Disclosure", 15162(1976). However, since the fading prevention effect itself of these complexes is not so high and the solubility thereof inorganic solvents is not high, it is difficult to add the complexes in an amount sufficient for obtaining the desired fading prevention effect. Furthermore, these complexes themselves are greatly colored and hence they have such difficulty that if a large amount of the complex is used, it gives bad influences on the color hue and the purity of the organic materials, in particular, dyes.

SUMMARY OF THE INVENTION

An object of this invention is to provide a method of improving the stability of organic substrate materials to light.

Another object of this information is to provide a method of improving the stability of organic substrate materials and, in particular, dyes to light without degrading their hue and purity.

Still another object of this invention is to provide a method of improving the stability of organic substrate materials to light using a particular stabilizer having relatively high solubility in organic solvents and high miscibility with the organic substrate materials.

A further object of this invention is to provide a method of improving the stability of dyes forming color photographic images to light.

Another object of this invention is to provide a method of improving the light fastness of dyes formed by the reaction of an oxidized aromatic primary amino color developing agent and color couplers.

A further object of the present invention is to provide a diffusion transfer color photographic material incorporating a particular stabilizer in which the transferred dye images possess improved light fastness.

Still a further object of the present invention is to improve the light fastness of colored polymers such as encountered in agricultural vinyl sheets, umbrellas, tents, etc."

Other objects of this invention will also become clear from the following description of the invention.

The above-described and other objects of this invention can be attained by the coexistence of at least one of the complexes shown by following formula I with the organic substrate materials having an absorption maximum in a wave length region of from about 300 n. m. to about 800 n. m. in an amount effective to stabilize the organic substrate material;

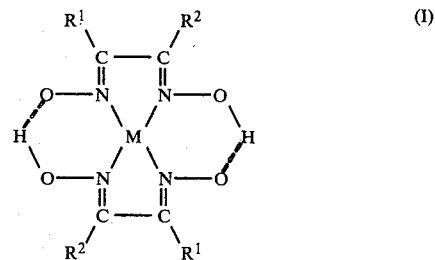

wherein M represents a copper atom, a cobalt atom, a nickel atom, a palladium atom or a platinum atom, and $R^1$ and $R^2$ independently (that is, $R^1$ and $R^2$ need not be identical) represent a hydrogen atom, an alkyl group, an aryl group, an acyl group, an N-alkylcarbamoyl group, an N-arylcarbamoyl group, an N-alkylsulfamoyl group, an N-arylsulfamoyl group, an alkoxycarbonyl group or an aryloxycarbonyl group.

DESCRIPTION OF THE INVENTION

The terms "in the presence of" or "coexistant with" as used in the specification refer not only to the coexistence of the substrate material and the compounds of formula (I) in the same solution, dispersion, emulsion layer, but also to the existence of the organic substrate material and the complex in, for example, adjacent layers of a multilayer photographic material. As long as the complex is associated with the organic substrate material in some way that it can improve the light fastness of the organic substrate material, it is used "in the presence of" or "coexists with" the substrate for purposes of the present invention. In particular, the terms include the embodiments of the invention discussed later in which an organic substrate material such as a photographic dye or a photographic dye image providing material is coated in one layer with the complexes used in the present invention or the substrate material and complex are coated in separate layers of a photographic material such that upon migration or diffusion the two materials interact to improve the light fastness of the substrate material.

As described above, the invention provides a method of improving the light fastness or light resistance of organic substrate materials (organic materials). The term "organic substrate material" or "substrate material" used in the specification includes materials which appear colored or colorless the human eye under sun light and thus includes not only materials having a absorption maximum in the visible region but also fluorescent whitening agents or materials having an absorption maximum in the infrared region. Thus, in this invention, the organic substrate materials include organic materials having an absorption maximum in a region from about 300 nm in ultraviolet region to about 800 nm in infrared region.

These organic substrate materials occur particularly in photographic materials, e.g., color films, prints, diffusion transfer units, etc., in colored polymers useful as agricultural vinyl cover sheets, umbrellas, tents, etc.; fluorescent whitening agents; and dyed textiles, etc.; and this invention is directed to improving the light fastness of these materials in each of these fields.

The term "dye" or "coloring matter" used in this invention are organic substrate materials which appear colored to the human eye under sunlight.

The term "light" used in this invention refers to electromagnetic radiation of wavelengths shorter than about 800 nm and includes ultraviolet rays of wavelength shorter than about 400 nm, visible radiation of from about 400 nm to about 700 nm, and infrared rays of from about 700 nm to about 800 nm.

Now, the general formula (I) showing the complexes used in this invention will be explained in detail.

Preferred alkyl groups represented by $R^1$ and $R^2$ are alkyl groups having from about 1 to 20 carbon atoms (exclusive of carbon atoms in the substitutent moieties in case of having substituents) which may be unsubstituted or substituted straight- or branched-chain alkyl groups. Examples of the alkyl groups represented by $R^1$ and $R^2$ include a methyl group, an ethyl group, a propyl group, a butyl group, a hexyl group, an octyl group, a decyl group, a dodecyl group, a tetradecyl group, a hexadecyl group and an octadecyl group.

Preferred aryl groups represented by $R^1$ and $R^2$ are aryl groups having from 6 to 14 carbon atoms, which may be substituted or unsubstituted. Examples of the aryl groups represented by $R^1$ and $R^2$ include a phenyl group, a naphthyl group, a tolyl group and a xylyl group.

Preferred acyl groups represented by $R^1$ and $R^2$ are acyl groups having the alkyl moiety of 1 to 20 carbon atoms or the aryl moiety of 6 to 14 carbon atoms (exclusive of carbon atoms in the substituent moieties in case of having substituents). Examples of such acyl groups include an acetyl group, a valeryl group, a stearoyl group, a benzoyl group and a toluoyl group.

Preferred N-alkylcarbamoyl groups represented by $R^1$ and $R^2$ are groups having from 2 to 21 carbon atoms (exclusive of carbon atoms in the substituent moieties in case of having substituents). Examples of such groups include an N-butylcarbamoyl group and an N-n-dodecylcarbamoyl group.

Preferred N-arylcarbamoyl groups represented by $R^1$ and $R^2$ are groups having from 7 to 15 carbon atoms (exclusive of carbon atoms in the substituent moieties in case of having substituents). An example thereof is an N-phenylcarbamoyl group.

Preferred N-alkylsulfamoyl groups represented by $R^1$ and $R^2$ are groups having from 1 to 20 carbon atoms (exclusive of carbon atoms in the substituent moieties in case of having substituents). An example thereof is an N-butylsulfamoyl group.

Preferred N-arylsulfamoyl groups represented by $R^1$ and $R^2$ are groups having from 6 to 14 carbon atoms (exclusive of carbon atoms in the substituent moieties in case of having substituents). An example thereof is an N-phenylsulfamoyl group.

Preferred alkoxycarbonyl groups represented by $R^1$ and $R^2$ are groups having from 2 to 21 carbon atoms (exclusive of carbon atoms in the substituent moieties in case of having substituents). Examples of such groups include an ethoxycarbonyl group, a butoxycarbonyl group and an n-hexadecyloxycarbonyl group.

Preferred aryloxycarbonyl groups represented by $R^1$ and $R^2$ are groups having from 7 to 15 carbon atoms (exclusive of carbon atoms in the substituent moieties in case of having substituents). An example thereof is a phenoxycarbonyl group.

The alkyl groups, aryl groups, acyl groups, N-alkylcarbamoyl groups, N-arylcarbamoyl groups, N-alkylsulfamoyl groups, N-arylsulfamoyl groups, alkoxycarbonyl groups and aryloxycarbonyl groups may be substituted by halogen atoms (for example, chlorine, bromine, fluorine or iodine), a cyano group, straight chain or branched chain alkyl groups (for example, a methyl group, ethyl group, propyl group, butyl group, hexyl group, octyl group, decyl group, dodecyl group, tetradecyl group, hexadecyl group, heptadecyl group, octadecyl group or methoxyethoxyethyl group), aryl groups (for example, a phenyl group, tolyl group, naphthyl group, chlorophenyl group, methoxyphenyl group or acetylphenyl group), alkoxy groups (for example, a methoxy group, ethoxy group, butoxy group, propoxy group or methoxyethoxy group), aryloxy groups (for example, a phenoxy group, tolyloxy group, naphthoxy group or methoxyphenoxy group), alkoxycarbonyl groups (for example, a methoxycarbonyl group, butoxycarbonyl group or phenoxymethoxycarbonyl group), aryloxycarbonyl groups (for example, a phenoxycarbonyl group, tolyloxycarbonyl group or methoxyphenoxycarbonyl group), acyl groups (for example, a formyl group, acetyl group, valeryl group, stearoyl group, benzoyl group, toluoyl group, naphthoyl group or p-methoxybenzoyl group), acyloxy groups (for example, an acetoxy group or acyloxy group), acylamino groups (for example, an acetamido group, benzamido group or methoxyacetamido group), anilino groups (for example, a phenylamino group, N-methylanilino group, N-phenylanilino group or N-acetylanilino group), alkylamino groups (for example, an n-butylamino group, N,N-diethylamino group or 4-methoxy-n-butylamino group), carbamoyl groups (for example, an n-butylcarbamoyl group, N,N-diethylcarbamoyl group), sulfamoyl groups (for example, an n-butylsulfamoyl group, N,N-diethylsulfamoyl group, n-dodecylsulfamoyl group or N-(4-methoxy-n-butyl)sulfamoyl group), sulfonylamino groups (for example, a methylsulfonylamino group, phenylsulfonylamino group or methoxymethylsulfonylamino group) or sulfonyl groups (for example, a mesyl group, tosyl group or methoxymethanesulfonyl group).

Unless otherwise indicated, the total carbon atom range of the alkyl or alkyl-containing group (i.e., acyl, N-alkylcarbamoyl, N-alkylsulfamoyl and alkoxycarbonyl) represented by $R^1$ and $R^2$, including substituents, if any, is preferably up to about 36; if the carbon atom range of the alkyl or alkyl-containing group exceeds the upper limit, complexes having such a group(s) would be dissolved only with extreme difficulty and such a poor solubility would adversely affect the system to be stabilized (this would be serious in case of photographic system in terms of fog formation due to poor solubility), though stabilization is effected even with such complexes. For the same reason, unless otherwise indicated, it is preferred that the total carbon atom number of the aryl or aryl-containing group represented by $R^1$ and $R^2$, including substituents, if any, be up to about 40.

Among the complexes represented by the formula (I), preferred complexes for use in the invention are represented by the following formula (IA):

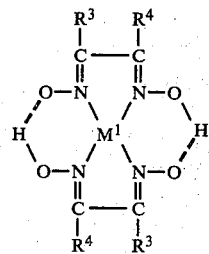
(IA)

In formula (IA), $M^1$ represents a copper atom, a cobalt atom, a nickel atom, a palladium atom or a platinum atom, and $R^3$ and $R^4$ independently represent each a hydrogen atom, an alkyl group, an aryl group, an N-alkylcarbamoyl group or an N-arylcarbamoyl group.

Examples of the alkyl groups, aryl groups, N-alkylcarbamoyl groups and N-arylcarbamoyl groups include the same groups as those described for $R^1$ and $R^2$ with respect to formula (I).

Complexes represented by the following structural formula, which are included within the above-described formula (I), can be effectively used according to this invention. However, the invention is not limited to the compounds specifically listed:

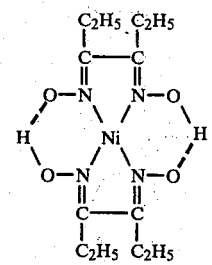
I-1

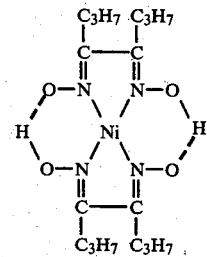
I-2

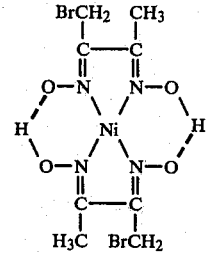
I-3

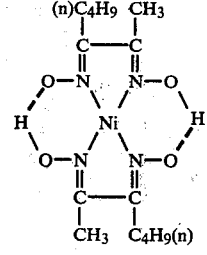
I-4

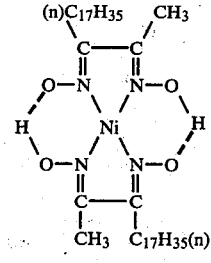
I-5

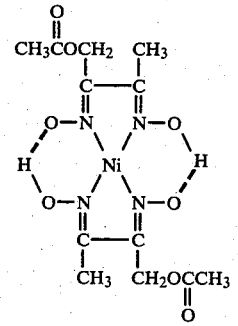
I-6

-continued
I-7 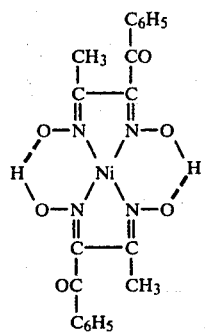
I-8 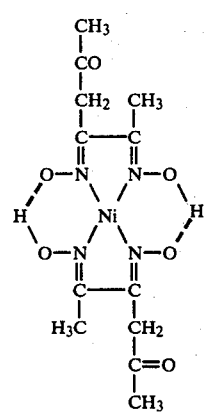
I-9 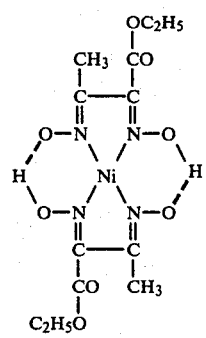
I-10 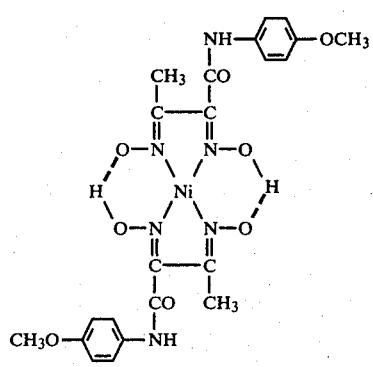
-continued
I-11 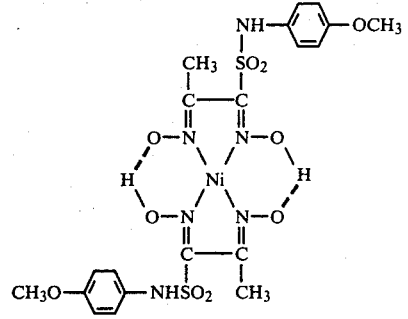
I-12 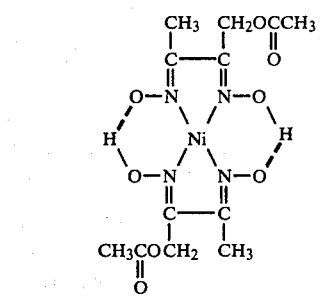
I-13 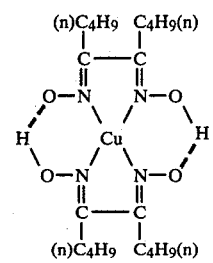
I-14 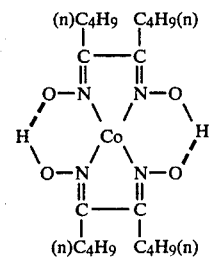
I-15 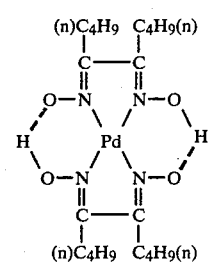
I-16 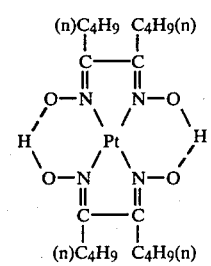

-continued

I-17

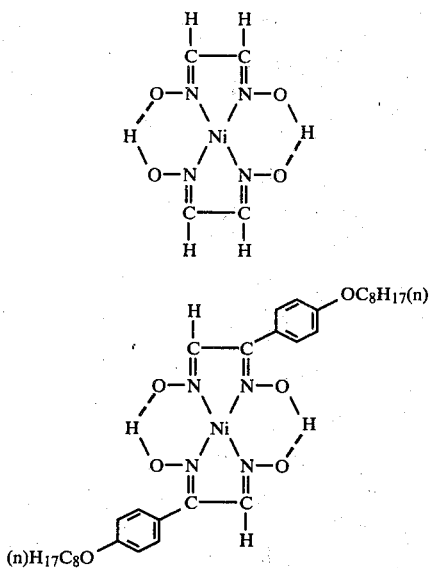

I-18

Of the above-described complexes, complexes I-4, I-5 and I-6 are particularly preferred.

The above-described complexes can be senthesized according to procedures described by L. Tschugaeff, *Z. Anorg. Allgem. Chem.*, Vol. 46, 144 (1905), G. Ponzio, *Gazz. Chim. Ital.*, Vol. 51, II, 213 (1921) and M. Milane & E. Borello, *Ann. Chim.*, (Rome), Vol. 41, 320 (1951). Exemplary syntheses are described below:

SYNTHESES

Synthesis of Complex I-4:

2 g of 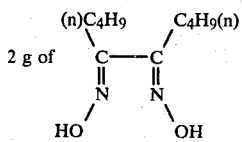

was dissolved in 50 ml of ethanol. To the resulting solution, an aqueous solution prepared by dissolving 1.2 g of nickel acetate tetrahydrate in 30 ml of water was added, with stirring, at a room temperature. Separated orange crystals were obtained, and were recrystallized using ethanol. Yield: 2.4 g.

Synthesis of I-6:

1.19 g of nickel chloride hexahydrate was dissolved in 40 ml of methanol. 1.74 g of

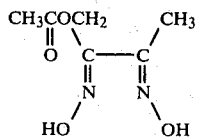

was dissolved in 40 ml of methanol. These solutions were mixed at a room temperature. To the resulting mixture, a solution prepared by dissolving 1.5 g of anhydrous potassium acetate in 50 ml of methanol was added dropwise with stirring at a room temperature. Fine crystals of the red complex were separated, and were recrystallized using hot methanol (or hot acetone). Yield: 2.1 g.

As will be apparent from the extensive discussion and examples of the organic substrate material which follows, the present invention is effective with a wide variety of organic materials.

The organic substrate materials in this invention include all dyes belonging to the following classes based on dyeing property, i.e., water-soluble dyes such as basic dyes, acid dyes, direct dyes, soluble vat dyes, mordant dyes, etc.; water-insoluble dyes such as sulfur dyes, vat dyes, oil colors, disperse dyes, azoic dyes, oxidation dyes, etc.; and reactive dyes. These organic substrate materials include not only the dyes which are seen as colored materials under sunlight but also colorless or light yellow fluorescent whitening dyes.

Of these dyes, the dyes preferably used in conjunction with this invention are quinoneimine dyes (e.g., azine dyes, oxazine dyes, thiazine dyes, etc.), methine and polymethine dyes (e.g., cyanine dyes, azomethine dyes, etc.), azo dyes, anthraquinone dyes, indoamine dyes, indophenol dyes, indigoid dyes, carbonium dyes, formazan dyes, etc., classified by chemical structure.

The organic substrate materials in this invention also include image-forming dyes used in the field of photography, for example, the dyes formed from color couplers, DRR compounds (dye releasing redox compounds), DDR couplers (diffusible dye releasing couplers), amidrazone compounds, dye developers, etc., and dyes for the silver dye bleach process.

Preferred organic substrate materials in this invention are photographically useful dyes such as anthraquinone dyes, quinoneimine dyes, azo dyes, methine dyes, polymethine dyes, indoamine dyes, indophenol dyes and formazan dyes, and fluorescent whitening agents which is useful for improving the background whiteness.

Furthermore, examples of the most preferred dyes used at the practice of this invention are methine dyes, polymethine dyes, indoamine dyes and indophenol dyes, which include compounds having the following moiety:

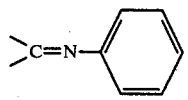

wherein the phenyl group may be substituted by one or more alkyl groups, alkoxy groups, halogen atoms, or amino groups.

The dye-forming couplers suitably used in this invention include yellow dye-forming couplers, magenta dye-forming couplers and cyan dye-forming couplers. These couplers may be so-called 4-equivalent couplers or 2-equivalent couplers as described in U.S. Pat. Nos. 3,277,155 and 3,458,315.

The yellow dye-forming couplers generally contain at least one methylene group activated by a carbonyl group (for example, open chain type ketomethylene groups) and include β-diketones and β-ketoacylamides such as, for example, benzylacetanilide and α-pivalylacetanilide. Examples of the suitable yellow couplers used in this invention are described in U.S. Pat. Nos. 2,875,057, 3,265,506, 3,408,194, 3,551,155, 3,582,322, 3,725,072 and 3,891,445, German Pat. No. 1,547,868, German Patent Application (OLS) Nos. 2,213,461, 2,219,917, 2,261,361, 2,263,875 and 2,414,006, British Pat. Nos. 1,421,123, 1,421,126 and 1,425,020, Japanese Patent Publication No. 10783/76 and Japanese Patent Application (OPI) Nos. 102636/76, 6341/75, 123342/75, 130442/75, 21827/76 and 87650/75.

As the magenta dye-forming couplers used in this invention, there are, for example, 5-pyrazolone type couplers. The couplers of this type are described in, for example, U.S. Pat. Nos. 2,600,788, 2,983,608, 3,062,653, 3,127,269, 3,311,476, 3,419,391, 3,519,429, 3,558,319, 3,582,322, 3,615,506, 3,834,908 and 3,891,445, German Pat. No. 1,810,464, German Patent Application (OLS) Nos. 2,408,665, 2,417,945, 2,418,959 and 2,424,467, Japanese Patent Publication Nos. 6031/65 and 45990/76 and Japanese Patent Application (OPI) Nos. 159336/75, 42121/77, 74028/74, 60233/75 and 26541/76.

Other magenta dye-forming couplers used in this invention are the indazolones of the type as described in Vittum and Weissberger, *Journal of Photographic Science*, Vol. 6, page 158 et seq. (1958), pyrazolinobezimidazole as described in U.S. Pat. No. 3,061,432, pyrazolo-s-triazole as described in Belgian Pat. No. 724,427, and 2-cyanoacetylcumarone as described in U.S. Pat. No. 2,115,394.

The cyan dye-forming couplers which can be used in this invention include phenol compounds and α-naphthol compounds. The compounds of this type are illustrated in U.S. Pat. Nos. 2,369,929, 2,434,272, 2,474,293, 2,521,908, 2,895,826, 3,034,892, 3,311,476, 3,458,315, 3,476,563, 3,583,971, 3,591,383, 3,767,411 and 4,004,929, German Patent Application (OLS) Nos. 2,414,830 and 2,454,329 and Japanese Patent Application (OPI) Nos. 59838/73, 26034/76, 5055/73 and 146828/76.

In addition, it is possible to use colored couplers, as are described, for example, in U.S. Pat. Nos. 3,476,560, 2,521,908 and 3,034,892, Japanese Patent Publication Nos. 2016/69, 22335/63, 11304/67 and 32461/69, Japanese Patent Application (OPI) Nos. 26034/76 and 42121/77 and German Patent Application (OLS) No. 2,418,959, etc., and DIR couplers as are described, for example, in U.S. Pat. Nos. 3,227,554, 3,617,291, 3,701,783, 3,790,384 and 3,632,345, German Patent Application (OLS) Nos. 2,414,006, 2,454,301 and 2,454,329, British Pat. No. 953,454, Japanese Patent Application (OPI) Nos. 69624/77, 122335/74 and 69624/77 and Japanese Patent Publication 16141/76.

In general, the couplers described above are further described in, for example, Kirk-Othmer, *Encyclopedia of Chemical Technology*, Vol. 5, pp. 822 to 825 and Glafkides, *Photographic Chemistry*, Vol. 2, pp. 596–614.

As described above, when such couplers are used in the practice of this invention, dyes are formed by the reaction of these couplers and an oxidized aromatic primary amino silver halide developing agent.

The developing agent described above includes an aminophenol and a phenylenediamine and they may include a mixture of them.

Typical examples of the developing agent which can form the organic substrate materials by combining with various couplers are illustrated as follows:

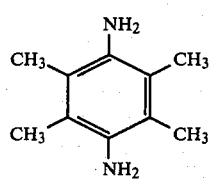
A

B

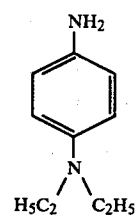
C

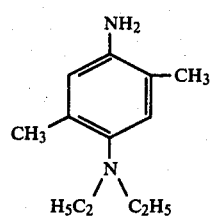
D

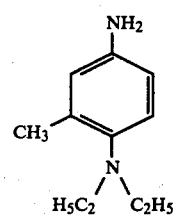
E

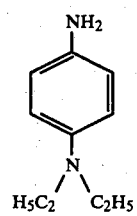
F

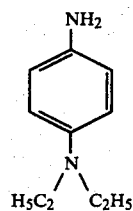
G

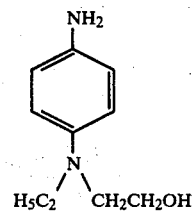
H

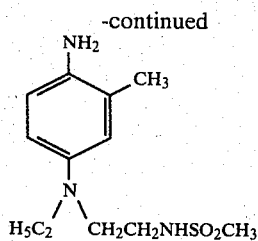　I

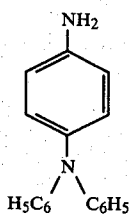　J

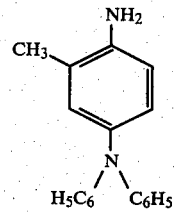　K

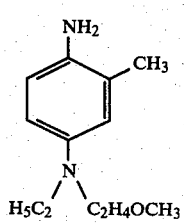　L

Representative examples of the developing agents capable of forming the substrate materials by coupling into various kinds of couplers according to an embodiment of the present invention are p-phenylenediamines and the derivatives thereof as described in T. H. James, *The Theory of the Photographic Process*, the fourth edition, pp. 315–320, Macmillan, New York (1977). Preferred p-phenylenediamines or the derivatives thereof are p-phenylenediamines in which at least one amino group is substituted by lower alkyl group(s) having 1 to 3 carbon atoms and the derivative thereof, for example, 4-amino-N,N-dimethylaniline, 4-amino-N,N-diethylaniline, 4-amino-3-methyl-N,N-diethylaniline, 4-amino-3-ethyl-N-ethyl-N-($\beta$-methanesulfonamidoethyl)aniline, 4-amino-N-ethyl-N-($\beta$-hydroxyethyl)aniline, 4-amino-3-methyl-N-ethyl-N-($\beta$-hydroxyethyl)aniline and so on.

Cyan, magenta and yellow couplers which are preferably employed are represented by the formulae (II), (III) or (IV) below, respectively:

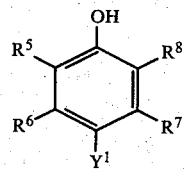　(II)

wherein $R^5$, $R^6$, $R^7$ and $R^8$ each represents a hydrogen atom, a halogen atom (e.g., fluorine, chlorine, bromine or iodine), an alkyl group having 1 to 20 carbon atoms (e.g., methyl, ethyl, octyl, dodecyl, tetradecyl, octa- decyl, etc.); an alkyl- or aryl-substituted carbamoyl wherein the aryl moiety has 6 to 10 carbon atoms (e.g., methylcarbamoyl, ethylcarbamoyl), dodecylcarbamoyl, tetradecylcarbamoyl, octadecylcarbamoyl, N-phenylcarbamoyl, N-tolylcarbamoyl, etc.); an alkyl- or aryl-substituted sulfamoyl group (e.g., methylsulfamoyl, ethylsulfamoyl, dodecylsulfamoyl, tetradecylsulfamoyl, octadecylsulfamoyl, N-phenylsulfamoyl, N-tolylsulfamoyl, etc.); an alkyl- or aryl-substituted amido group (e.g., acetamido, propionamido, benzamido, phenacetamido, etc.); a sulfonamido group (e.g., benzenesulfonamido), a phosphoric acid amido group, a ureido group, etc.

$R^5$ and $R^6$ may combine with each other to form a 6-membered carbocyclic ring (e.g., a benzene ring which may further be substituted with a $C_1$–$C_{20}$ alkyl or $C_6$–$C_{14}$ aryl group).

$Y^1$ represents a hydrogen atom, a halogen atom (e.g., fluorine, chlorine, bromine or iodine); or a group which is releasable upon the reaction with the oxidation product of a developing agent (e.g., an alkoxy group wherein the alkyl moiety has 1 to 20 carbon atoms; an aryloxy group wherein the aryl moiety has 6 to 10 carbon atoms; a sulfonamido group, a sulfonyl group, a carbamoyl group, an imido group, an aminosulfonyloxy group, an alkylcarbonyloxy group, and arylcarbonyloxy group, an alkylthio group, an arylthio group, a heterocyclic ring thio group, etc.; the details of which are well known in the art.

The alkyl, carbamoyl, sulfamoyl and amido groups expressed by $R^5$, $R^6$, $R^7$ and $R^8$, or the 6-membered ring formed by combining $R^5$ and $R^6$ with each other can also be substituted with other substituents, for example, a $C_1$–$C_{20}$ alkyl group (e.g., methyl, ethyl, propyl, octyl, dodecyl, tetradecyl, octadecyl, etc.); a $C_6$–$C_{14}$ aryl group (e.g., phenyl, tolyl, naphthyl, etc.); a $C_6$–$C_{14}$ aryloxy group (e.g., phenoxy, 2,5-di(t)-amylphenoxy, etc.); a halogen atom (e.g., chlorine, bromine, fluorine, etc.); and the like.

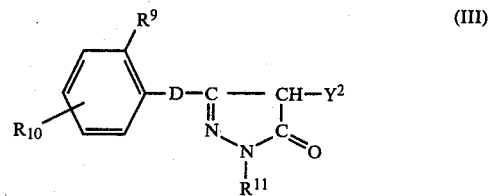　(III)

wherein $R^9$ represents a hydrogen atom, a halogen atom (e.g., chlorine, bromine, fluorine, etc.); a $C_1$–$C_{20}$ alkyl group (e.g., methyl, ethyl, n-propyl, etc.); or a $C_1$–$C_{20}$ alkoxy group (e.g., methoxy, ethoxy, etc.); $R^{10}$ represents a $C_1$–$C_{20}$ alkyl group (e.g., methyl, ethyl, octyl, dodecyl, tetradecyl, octadecyl, etc.); an amido group (e.g., butanamido, decanamido, tetradecanamido, nonadecanamido, etc.); an imido group (e.g., tetradecylsuccinimido, octadecenylsuccinimido, etc.); an N-alkylcarbamoyl group the alkyl moiety of which contains 1 to 20 carbon atoms (e.g., decylcarbamoyl, tetradecylcarbamoyl, octadecylcarbamoyl, etc.); an N-alkylsulfamoyl group the alkyl moiety of which contains 1 to 20 carbon atoms (e.g., decysulfamoyl, tetradecylsulfamoyl, octadecylsulfamoyl, etc.); an N-alkoxycarbonyl group the alkyl moiety of which contains 1 to 20 carbon atoms (e.g., decyloxycarbonyl, tetradecyloxycarbonyl, octadecyloxycarbonyl, etc.); an acyloxy group (e.g., valeryloxy, palmitoyloxy, stearoyloxy, oleyloxy, benzoyloxy, toluoyloxy, etc.); a sulfonamido group, a urethane group, etc.; and $R^{11}$ represents a $C_6$–$C_{14}$ aryl group (e.g., phenyl, naphthyl, etc.).

D represents an amino group, a carbonylamino group, or a ureido group.

$Y^2$ represents a hydrogen atom, a halogen atom (e.g., chlorine, bromine, etc.); or a group which is releasable upon reaction with the oxidation product of a developing agent (e.g., an arylazo group, an aryloxy group, an acyloxy group, an alkylthio group, an arylthio group, etc.). Such groups are well known.

The alkyl or alkoxy group represented by $R^9$, the alkyl, amido, N-alkylcarbamoyl, N-alkylsulfamoyl, alkoxycarbonyl or acyloxy group represented by $R^{10}$, or the aryl group represented by $R^{11}$ can also be substituted with other substituents, for example, an alkyl group, an aryl group, an alkoxy group, an aryloxy group, an amido group, an N-alkylcarbamoyl group, an N-alkylsulfamoyl group, an acyloxy group, a carboxy group, asulfo group, a halogen atom (e.g., chlorine, bromine, fluorine, etc.), etc., said alkyl and aryl moieties having 1 to 20 and 6 to 14 carbom atoms, respectively.

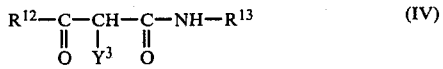

wherein $R^{12}$ represents a $C_1$–$C_{20}$ alkyl group (e.g., methyl, ethyl, (t)-butyl, (t)-octyl, etc.) or a $C_6$–$C_{14}$ aryl group (e.g., phenyl) and $R^{13}$ represents a $C_6$–$C_{14}$ aryl group (e.g., phenyl).

$Y^3$ represents a hydrogen atom, a halogen atom (e.g., chlorine, bromine, etc.), or a group which is releasable upon reaction with the oxidation product of a developing agent, for example, a heterocyclic nuclei (e.g., naphthoimido, succinimido, 5,5-dimethylhydantoinyl, 2,4-oxazolidinedione residue, imido, pyridone residue, pyridazone residue, etc.), an acyloxy group, a sulfonyloxy group, an aryloxy group, a ureido group, which are well known in the art.

The alkyl or aryl group represented by $R^{12}$ and the aryl group represented by $R^{13}$ can also be substituted with other substituents, for example, an alkyl group, an aryl group, an alkoxy group, an aryloxy group, an amido group, an N-alkyl-carbamoyl group, an N-alkylsulfamoyl group, an acyloxy group, a carboxy group, a sulfo group, a sulfonamido group, a halogen atom, etc., the alkyl and aryl moieties of which contain 1 to 20 and 6 to 14 carbon atoms, respectively.

Then, practical examples of the couplers which can form organic substrate materials by the reaction with the aforesaid or other developing agents are as follows:

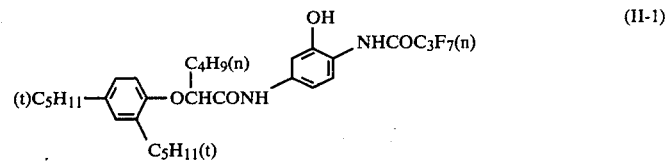

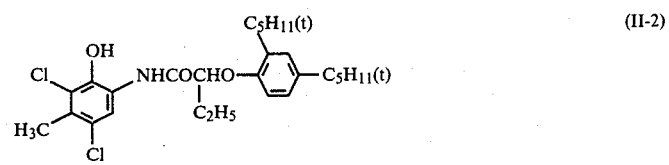

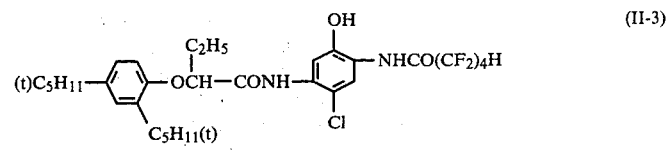

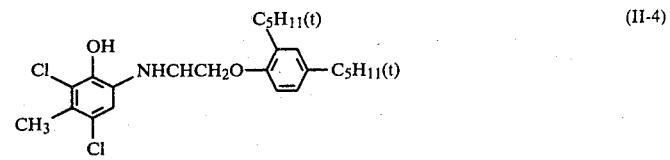

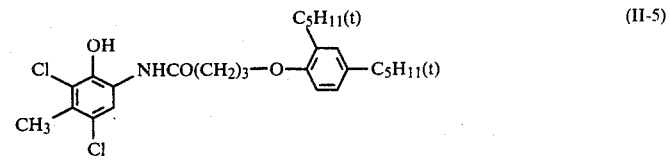

-continued
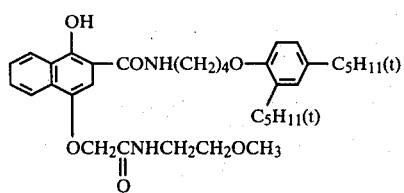 (II-7)
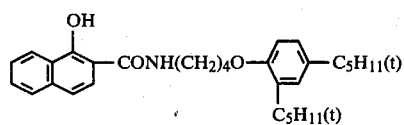 (II-8)
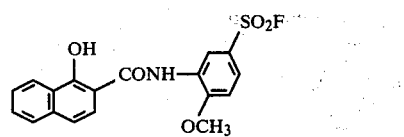 (II-9)
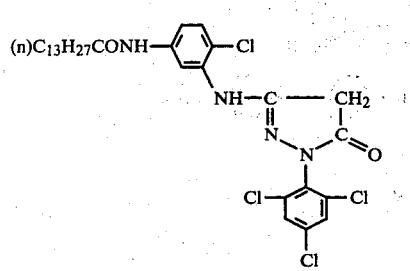 (III-1)
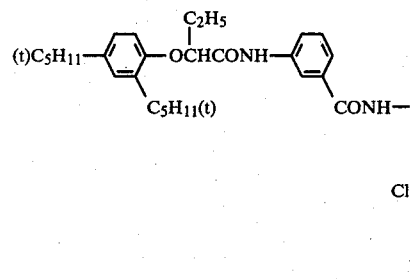 (III-2)
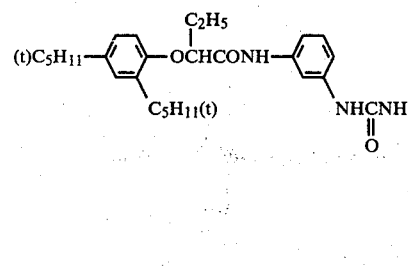 (III-3)
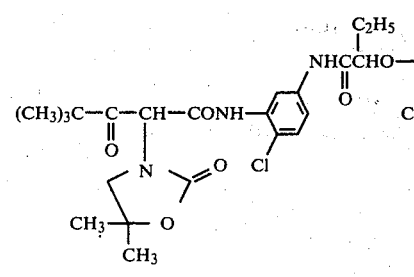 (IV-1)

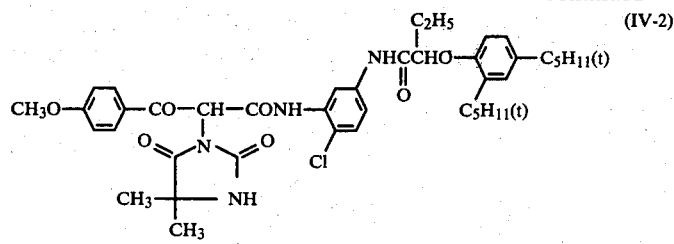
Other practical examples of dyes used as the organic substrate materials in this invention are as follows:
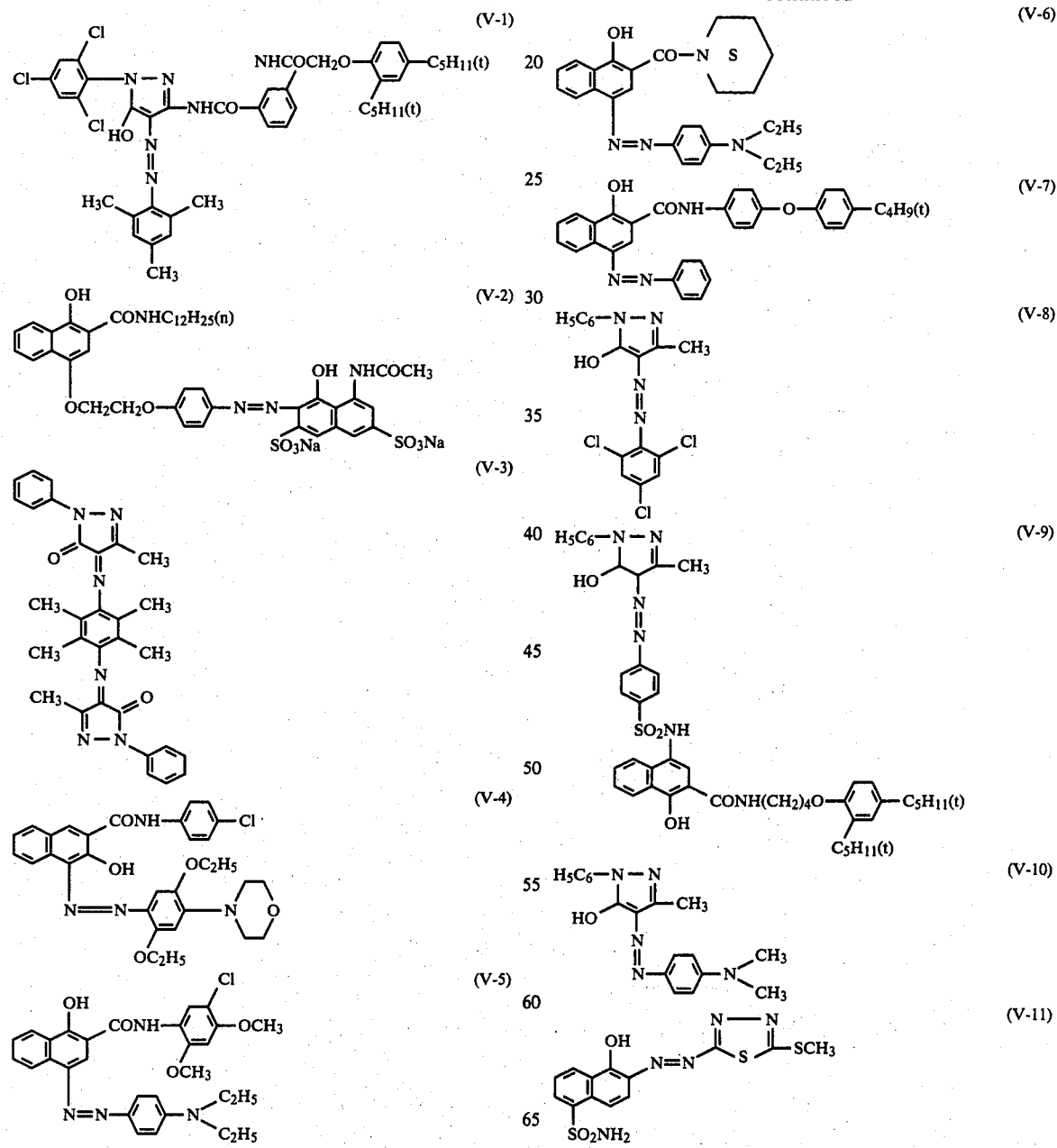

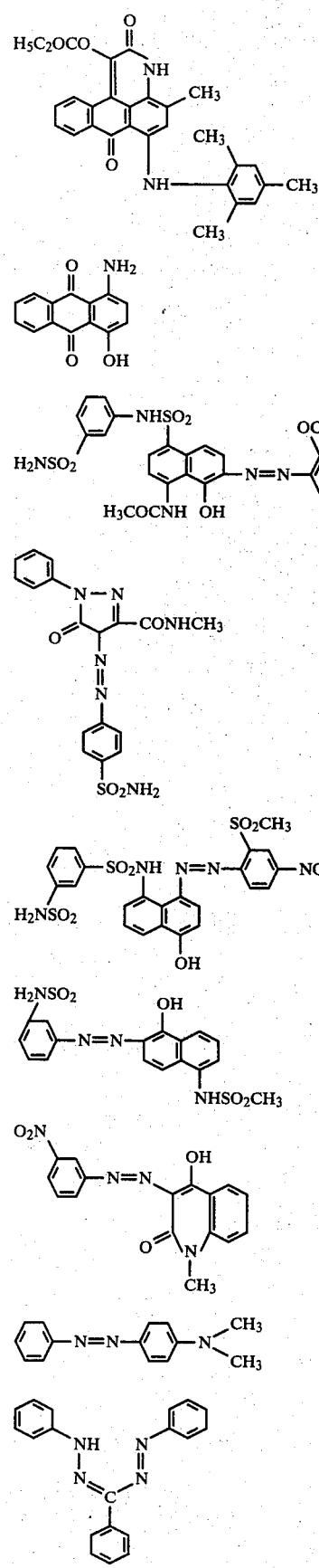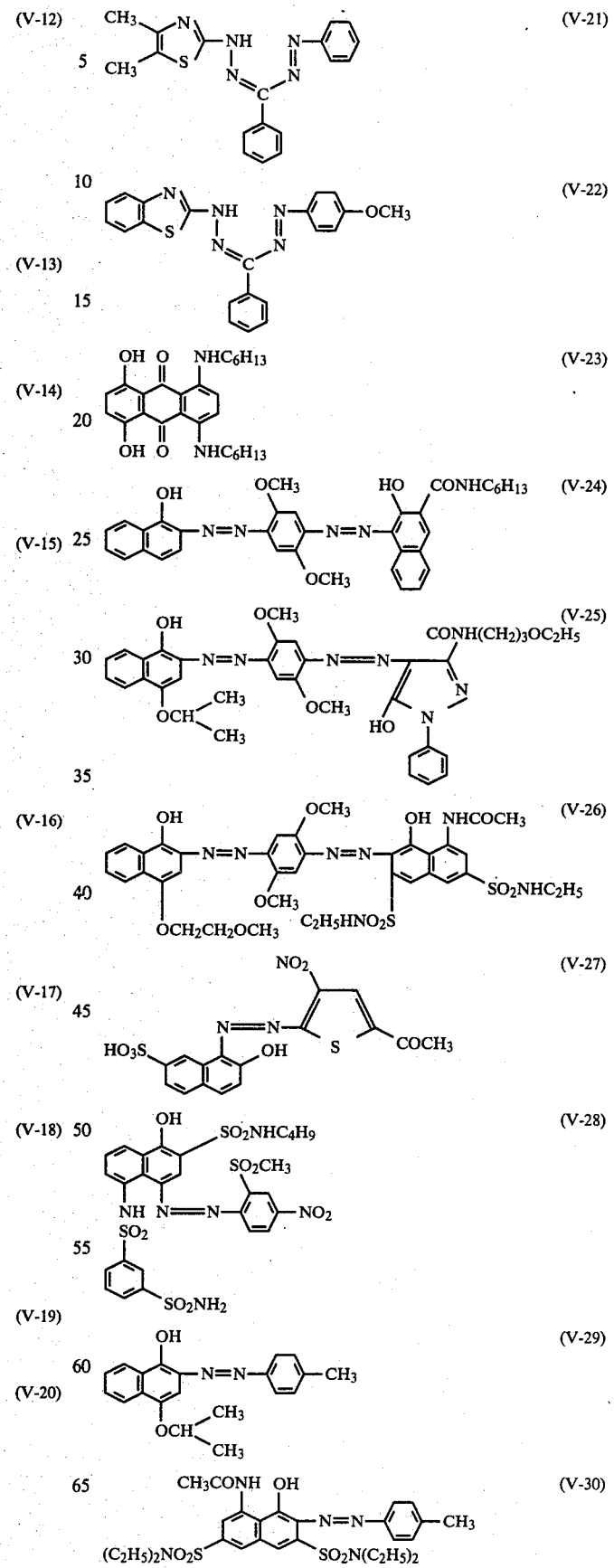

-continued

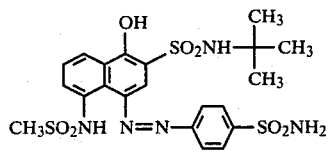 (V-31)

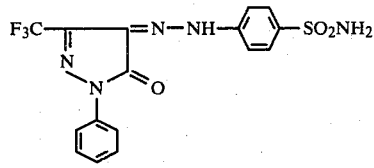 (V-32)

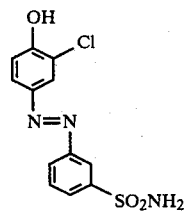 (V-33)

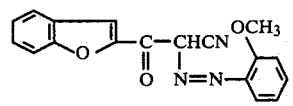 (V-34)

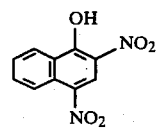 (V-35)

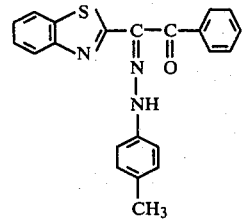 (V-36)

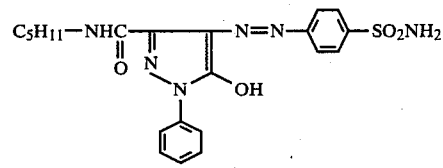 (V-37)

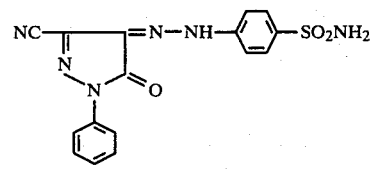 (V-38)

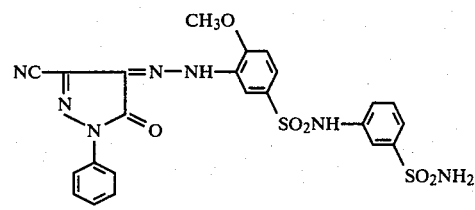 (V-39)

-continued

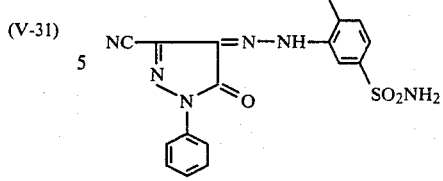 (V-40)

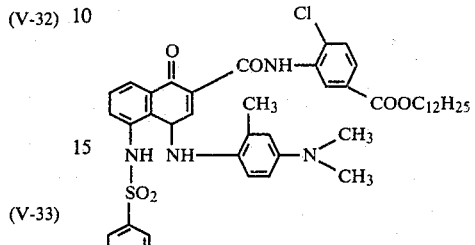 (V-41)

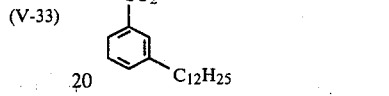

Other types of dyes preferably used in this invention are dyes formed by the oxidation of DRR compounds such as described in U.S. Published Application 351,673, U.S. Pat. Nos. 3,932,381, 3,928,312, 3,931,144, 3,954,476, 3,929,760, 3,942,987, 3,932,380, 4,013,635, and 4,013,633, Japanese Patent Application (OPI) Nos. 113,624/76, 109,928/76, 104,343/76 and 4,819/77, Japanese Patent application No. 64,533/77 and Research Disclosure, 68–74 (1976, Nov.) and Research Disclosure, No. 13,024 (1975).

Dyes released by the reaction of an oxidized color developing agent and the DDR couplers also used in this invention are described in British Pat. Nos. 840,781, 904,364, 932,272, 1,014,725, 1,038,331, 1,066,352 and 1,097,064, Japanese Patent Application (OPI) No. 133,021/76, U.S. (U.S. Defensive publication) T900,029, and U.S. Pat. No. 3,227,550. Still other types of dyes suitably used in this invention are dye developing agents such as described in Japanese Patent Publication Nos. 182/60, 18,332/60, 32,130/73, 43,950/71 and 2,618/74.

Dyes formed in a silver dye bleach process are also suitable for use in the present invention. As yellow dyes used for the purpose, there are azo dyes such as Direct Fast Yellow GC (C.I. 29,000) Chrysophenine (C.I. 24,895), etc.; benzoquinone dyes such as Indigo Golden Yellow IGK (C.I. 59,101), Indigosol Yellow 2GB (C.I. 61,726), Algosol Yellow GCA-CF (C.I. 67,301), Indanthrene Yellow GF (C.I. 68,420), Mikethrene Yellow GC (C.I. 67,300), Indanthrene Yellow 4GK (C.I. 68,405), etc.; anthraquinone series soluble vat dyes; polycyclic soluble vat dyes; and other vat dyes. As magenta dyes used for the above-mentioned purpose, there are illustrated azo dyes such as Sumilight Supra Rubinol B (C.I. 29,225), Benzo Brilliant Geranine B (C.I. 15,080), etc.; indigoid dyes such as Indigosol Brilliant Pink IR (C.I. 73,361), Indigosol Violet 15R (C.I. 59,321), Indigosol Red Violet IRRL (C.I. 59,316), Indanthrene Red Violet RRK (C.I. 67,895), Mikethrene Brilliant Violet BBK (C.I. 6335), etc.; benzoquinone series soluble vat dyes; anthraquinone series soluble vat dyes; heterocyclic soluble vat dyes; and other vat dyes. As cyan dyes used for the above purpose, there are illustrated azo dyes such as Direct Sky Blue 6B (C.I. 24,410), Direct Brilliant Blue 2B (C.I. 22,610), Sumilight Supra Blue G (C.I. 34,200), etc.; phthalocyanine dyes such as Sumilight Supra Turkish Blue G (C.I.

74,180), Mikethrene Brilliant Blue 4G (C.I. 74,140), etc.; Indanthrene Turkish Blue 5G (C.I. 69,845), Indanthrene Blue GCD (C.I. 73,066), Indigosol 04G (C.I. 73,046), Anthrasol Green (C.I. 59,826), etc.

While the mechanism whereby the complex of the present invention improves light fastness is not entirely clear, it is believed that upon exposure to light the organic substrate (dye image) is excited to a triplet state whereupon the complex interacts with the excited dye to absorb the high energy and thus restore the dye to its original state. Alternatively, oxygen may be excited upon exposure to a singlet state in which case the complex absorbs the high energy of the excited oxygen and restores the oxygen to its original state. In any case the complex of the present invention effectively improves the light fastness of the organic substrate.

As described above, the metal complexes are used in this invention for stabilizing the organic substrate materials. These compounds may be incorporated in one or more silver halide emulsion layers of a color photographic material. Also, these compounds may be incorporated in a layer included in the non-sensitive portion of color photographic transfer materials. The complexes can be supplied for stabilizing photographic images by incorporation into the hydrophilic colloids constituting the photographic layers of a photographic element. The complexes are incorporated as a solution thereof in an organic solvent having low boiling point or an organic solvent miscible with water which does not adversely influence the photographic properties of the photographic layers, such as, for example, an alcohol (e.g., methanol, ethanol, isopropanol, butanol, etc.) an ether (e.g., dimethyl ether, ethyl methyl ether, diethyl ether, 1-ethoxypropane, etc.), a glycol (e.g., 1,2-ethanediol, 1,2-propanediol, 1,3-propanediol, etc.), a ketone (e.g., acetone, ethyl methyl ketone, 3-pentanone, etc.), an ester (e.g., ethyl formate, methyl acetate, ethyl acetate, etc.), an amide (e.g., formamide, acetamide, succinamide, etc.), and the like. It is desirable that the complex be incorporated before coating, such as when producing silver halide photographic emulsions, when forming an emulsified dispersion of couplers, or when preparing photographic coating compositions.

In other to introduce these complexes into hydrophilic colloids constituting photographic layers, methods usually employed for dispersing couplers in the color photographic fields may be employed. In this regard, U.S. Pat. Nos. 2,304,939 and 2,322,027 disclose the use of high boiling organic solvents for dissolving these materials. Other applicable methods are described in U.S. Pat. Nos. 2,801,170, 2,801,171 and 2,949,360, wherein low boiling or water-soluble organic solvents are used together with high boiling organic solvents.

Examples of the high boiling organic solvents which are effective for dispersing the substrate material and metal complexes in this invention are di-n-butyl phthalate, benzyl phthalate, triphenyl phosphate, tri-o-cresyl phosphate, di-phenylmono-p-tert-butylphenyl phosphate, monophenyl-di-p-tert-butylphenyl phosphate, diphenyl-mono-o-chlorophenyl phosphate, monophenyl-di-o-chlorophenyl phosphate, 2,4-di-n-amylphenol, 2,4-di-t-amylphenol, N,N-diethyllaurylamide as well as trioctyl phosphate and trihexyl phosphate described in U.S. Pat. 3,676,137.

The low boiling or water-soluble organic solvents which can be advantageously used together with these high boiling organic solvents are disclosed in, for example, U.S. Pats. 2,801,171, 2,801,170 and 2,949,360.

These organic solvents include:

(1) low boiling organic solvents substantially immiscible in water, such as, for example, methyl acetate, ethyl acetate, propyl acetate, butyl acetate, isopropyl acetate, ethyl propionate, sec-butyl alcohol, ethyl formate, butyl formate, nitromethane, nitroethane, carbon tetrachloride, chloroform, etc., and (2) water-miscible organic solvents such as, for example, methyl isobutyl ketone, $\beta$-ethoxyethyl acetate, $\beta$-butoxytetrahydrofurfuryl adipate, diethylene glycol monoacetate,, methoxytriglycol acetate, acetonylacetone, diacetone alcohol, ethylene glycol, acetone, methanol, ethanol, acetonitrile, dimethylformamide, dioxane, diethylene glycol, dipropylene glycol, acetone, etc.

In general, the complex of the formula (I) is dissolved or suspended in an appropriate solvent which is choosen depending upon the physical properties of the complex used from water, water-miscible and water-immiscible organic and inorganic solvents (the details of which are described in U.S. Pat. No. 3,966,468) and the organic substrate material is dissolved or suspended therein. Alternatively, again depending upon the physical properties of the compounds, solutions and/or dispersions may be prepared separately and subsequently mixed. For example, a fluorescent whitening agent may be dissolved or suspended in an organic or inorganic solvent such as water or dimethyl formamide, etc., together with the complex of the present invention or separately; and the mixture may be coated onto or incorporated into a suitable base substance. An adjacent double layer coating is possible and in some cases may be preferred if some diffusion between the contiguous layers occurs and light fastness improvement is effected.

The present invention can also be used to improve the light fastness of a colored polymer. A colored polymer is a polymer containing a coloring material in a state of molecular dispersion or melt. The polymer is represented by natural resins other than gelatin, e.g., cellulose and derivatives thereof, vinyl resins, polycondensates, silicone resins, alkyd resins, polyamides, paraffin and mineral waxes as described in U.S. Pat. No. 3,966,468. Where it is desired to improve the light fastness in a colored polymer for use of agricultural vinyl sheets, the colored polymer and complex of the formula (I) are likewise mixed in the form of a solution, dispersion, etc., followed by extrusion molding, etc., in a conventional manner.

In the case of a photographic material, the substrate material (the dye image) and the complex each may be present in one or more of the hydrophilic colloid layer making up a photographic element (e.g., a film, paper, diffusion transfer unit, etc.). It is preferred that the metal chelate and the organic substrate material be present (i.e., coexist) in the same emulsion layer, of course, the effect of the present invention can also be attained when the complex and substrate are present in contiguous layers and diffusion occurs between the layers. Where undesirable diffusion occurs, conventional mordanting techniques could be applied to the present invention.

In the case of incorporating the complex into a silver halide emulsion layer, the complex can be incorporated into each emulsion layer making up the photographic element. In this case, the total amount of complex present is in the range set forth below. The complex and substrate may be present in non-light-sensitive elements or layers such as the dye image-receiving layer used in diffusion transfer film units. In the case of image transfer units, the metal chelate complex is preferably located in the layer in which the dye images are finally found. i.e., in an image-receiving layer. Usually, the dye images formed in the image-receiving layer do not diffuse further into any other layer(s) so that the complex is easily maintained in the vicinity of the dye. When the organic substrate material and the complex are incorporated in such a non-photosensitive image-recording or image-receiving element, they are mordanted. The complex contains a ligand capable of retaining it in the mordant layer of the image-receiving element so that it does not diffuse away from the dye stabilized thereby.

A number of types of image transfer film units are particularly appropriate for the practice of the present invention; One is the imbibition transfer film unit set forth in U.S. Pat. No. 2,882,156. The present invention can be further used in conjunction with the color image transfer film unit described in U.S. Pat. Nos. 2,087,817, 3,185,567, 2,983,606, 3,253,915, 3,227,550, 3,227,551, 3,227,552, 3,415,644, 3,415,645, 3,415,646, 3,594,164 and 3,594,165 and Belgian Pat. Nos. 757,959 and 757,960.

The organic substrate materials and the complexes used in the practice of this invention can be used together with the materials as described in *Product Licensing Index*, Vol. 92, No. 9232, 107–110 (1971, December) according to the manner as described therein.

Any amount of the complex will bring about some improvement in the light fastness of the organic substrate and theoretically there is no upper limit for the amount of the complex. Preferably, the complex is present in an amount of at least 0.1 mol % based on 1 mol of the organic substrate material, more preferably in an amount of 0.1 to 1,000 mol %, and most preferably in an amount of 1 to 300 mol %. In the case of a photographic material, the amount is often expressed in terms of a weight unit per square meter of photographic material which can be calculated from the parameters set out above. In the case of a photographic material, the complex is preferably present in an amount of at least 1 micromole per square meter of the photographic material, and more preferably in an amount of from about 10 to $1 \times 10^4$ micromoles per square meter of the material. The concentration of the substrate material corresponds in general to that for the image forming material usually adopted in color photographic technology, as is well known to those skilled in the art, the substrate material is preferably present in the range of from about 10 to $10^4$ micromoles per square meter of the photographic material. A more preferable range is from about 100 to about $3 \times 10^3$ micromoles per square meter of the photographic product.

The organic substrate material used in this invention has a maximum absorption peak in the wavelength region less than about 800 nm. However, the organic substrate material having the maximum absorption peak in the region of from about 300 nm to about 800 nm is preferred and the organic substrate material having the maximum absorption peak in the range of from about 400 nm of about 800 nm is most preferred.

In photographic materials based on this invention, any material ordinarily used as the supports for photographic materials may be used as the support therefor in this invention. Examples thereof are cellulose nitrate films, cellulose acetate films, cellulose acetate butyrate films, cellulose acetate proprionate films, polystyrene films, polyethylene terephthalate films, polycarbonate films, laminated sheets of these films, and papers. Also, baryta-coated papers, papers coated with α-olefin polymer, in particular, a polymer of an α-olefin having 2 to 10 carbon atoms, such as polyethylene, polypropylene, etc., and plastic films the surface of which have been roughened to improve their adhesion to other polymers as shown in Japanese Patent Publication No. 19,068/72 are preferably used as the supports for photographic materials.

In photographic materials used in the method of this invention, various hydrophilic colloids are used. Examples of the hydrophilic colloids used as the binders for photographic silver halide emulsions and/or other coating compositions for photographic layers are gelatin; colloidal albumin; casein; cellulose derivatives such as carboxymethyl cellulose, hydroxyethyl cellulose, etc.; sugar derivatives such as agar, sodium alginate, starch derivatives, etc.; synthetic hydrophilic colloids such as polyvinyl alcohol, poly-N-vinylpyrrolidone, polyacrylic acid copolymers, maleic anhydride copolymers, polyacrylamide, and the derivatives or partially hydrolyzed products thereof. If necessary, a mixture of two or more of these colloids which are compatible with each other may be used.

Among the aforesaid materials, gelatin is most generally used but gelatin may be replaced partially or wholly with a synthetic polymer. Furthermore, so-called gelatin derivatives, that is, gelatin modified by treatment with an amino group, an imino group, a hydroxy group, a carboxy group, etc., contained in the gelatin molecule as a functional group with a reagent having a functional group which can react with these groups or graft gelatin having bonded thereto the molecular chain of another polymer may be used in place of gelatin.

The silver halide photographic emulsion layers or other photographic layers of photographic materials used in this invention may further contain synthetic polymers such as, for example, water-dispersed vinyl polymers in the form of a latex, in particular, a compound or compounds capable of increasing the dimensional stability of the photographic materials solely or together with a hydrophilic water-permeable colloid.

The silver halide photographic emulsion used in the method of this invention is usually prepared by mixing an aqueous solution of a water-soluble silver salt (e.g., silver nitrate) and an aqueous solution of a water-soluble halogen salt (e.g., potassium bromide) in the presence of a water soluble polymer solution such as an aqueous solution of gelatin. As such a silver halide, there is silver chloride, silver bromide as well as mixed silver halides such as silver chlorobromide, silver chloroiodide, silver chloroiodobromide, etc. These silver halide grains may be prepared according to a known or conventional process. As a matter of course, they may be advantageously prepared using the so-called single jet method or double jet method or the controlled double jet method. Also, two or more different silver halide emulsions prepared separately may be used in mixture.

The above-mentioned silver halide photographic emulsions may further contain various compounds for preventing a reduction in sensitivity and the formation of fog during production, preservation or processing of the photographic material. As examples of such compounds, there are 4-hydroxy-6-methyl-1,3,3a,7-tetrazaindene, 3-methylbenzothiazole, 1-phenyl-5-mercaptotetrazole as well as many heterocyclic compounds, mercury-containing compounds, mercapto compounds, metal salts, etc.

The silver halide emulsions used in this invention may also be chemically sensitized in a conventional manner. As examples of chemical sensitizers used for the purpose, there are gold compounds such as an aurichlorate, gold trichloride, etc.; salts of noble metals such as platinum, palladium, iridium, and rhodium; sulfur compounds capable of forming silver sulfide by causing reaction with a silver salt, such as sodium thiosulfate, etc.; stannous salts, amines; and other reducing materials.

The silver halide photographic emulsions used in this invention may, if necessary, be subjected to a spectral sensitization or super dye sensitization using cyanine dyes such as cyanine, merocyanine, carbocyanine, etc., solely or as a combination thereof or using a combination of the cyanine dye or dyes and styryl dyes. These dyes are properly selected according to the objects and use of the photographic materials, such as the wavelength region and sensitivity to be stabilized.

The hydrophilic colloid layers of photographic materials used in the method of this invention can be, if necessary, hardened by various cross-linking agents, for example, aldehyde series compounds, active halogen compounds, vinylsulfone compounds, carbodiimide compounds, N-methylol compounds, epoxy compounds, etc.

In applying the method of this invention to color photographic materials, after image exposure, the color photographic material may be processed in a conventional manner to form color images. The main processing steps in such case are color development, bleach, and fix and, if necessary, other steps such as washing and stabilization. In these steps, two or more steps may be performed in one step as blix step. The color development is usually performed in an alkaline solution containing an aromatic primary amine developing agent. Preferred examples of the aromatic primary amine developing agent are the compounds shown by formulae (A) to (L) described above.

In applying the method of this invention to color photographic materials, wherein the color photographic material is a color photographic diffusion transfer film unit, the processing of the photographic material is carried out automatically in the photographic material. In this case, a color developer containing a color developing agent is contained in a rupturable container. As the developing agent, N-methylaminophenol, 1-phenyl-3-pyrazolidone, 1-phenyl-4,4-dimethyl-3-pyrazolidone, 1-phenyl-4-methylhydroxymethyl-3-pyrazolidone, 3-methoxy-N,N-diethyl-p-phenylenediamine, etc., in addition to the compounds shown by formulae (A) to (L) above are suitable.

For forming color images in photographic materials based on this invention, various known methods can be used, such as the coupling reaction of the above-described dye-forming color couplers and the oxidation product of a p-phenylenediamine series color developing agent; development with a dye developer; the oxidation cleavage reaction of DRR compounds; the dye-releasing reaction upon coupling of DDR couplers; the dye-forming reaction upon coupling reaction of DDR couplers and a silver dye bleaching process.

Accordingly, this invention can be applied to various kinds of color photographic materials such as color positive films, color papers, color negative films, color reversal films, color diffusion transfer film units, silver dye bleaching photographic materials, etc.

The stabilizing process of the invention is particularly useful for a photographic system in that color reproduction and color hue are not affected by the use of the complex in a stabilizing amount. Furthermore, in the invention, UV is cut out in all examples described below using a UV cut filter to evaluate stabilization effects. The invention is thus seen to be directed to the stabilization of, in particular, photographically useful dyes and fluorescent whitening agents which deteriorate by the action of radiation other than UV radiation.

The following examples are provided for further understanding of the method of this invention. They are not to be construed as limiting.

EXAMPLE 1

0.1 g of 1-(2,4,6-trichlorophenyl)-3-(2-chloro-5-tetradecaneamido)anilino-4-[4-(N-ethyl-N-$\beta$-methanesulfonamidoethyl)aminophenylimino]-5-oxo-2-pyrazoline was dissolved in a mixture of 3 ml of tricresyl phosphate and 5 ml of ethyl acetate. The resulting solution was emulsified in 10 g of 10% gelatin containing 1 ml of a 1% aqueous solution of sodium dodecylbenzenesulfonate. The thus emulsified dispersion was then mixed with 10 g of 10% gelatin, and the resulting mixture was applied to a paper base in which both faces were laminated with polyethylene, and dried. (Sample A).

12.7 mg of the compound I-4 of the present invention was added in case of producing the above-described emulsified dispersion and the resulting emulsified dispersion was applied by the same manner as in Sample A to produce Sample B. Further, 11 mg and 110 mg of 2,5-di-t-octylhydroquinone were added respectively as an agent for preventing fading of dyes and the resulting emulsions were applied by the same manner as in Sample A to produce Samples C and D.

In these samples, the application was carried out so as to be 60 mg/m². These samples A to D were subjected to a fading test for 48 hours by a xenon tester (illuminance: 200,000 luxes) equipped with an ultraviolet ray cut filter C-40 produced by Fuji Photo Film Co. The results are shown in Table I.

TABLE I

|  | Initial Density | Density after Testing |
| --- | --- | --- |
| Sample A | 0.80 | 0.12 |
| Sample B | 0.82 | 0.58 |
| Sample C | 0.82 | 0.22 |
| Sample D | 0.81 | 0.35 |

The measurement was carried out by a Macbeth densitometer RD514 with using a green filter of Status AA filter. It had been ascertained that the fading is very small in case of Sample B which contained the compound I-4 of the present invention as compared with other Samples A, C and D, and, particularly, 2,5-di-tert-octylhydroquinone was hardly effective for preventing fading in case of Samples C and D, though it was added in the equimolar amount to or tenfold higher than the compound I-4 of the present invention. This fact shows that the compound I-4 of the present invention shows a very desirable effect in preventing fading of dyes.

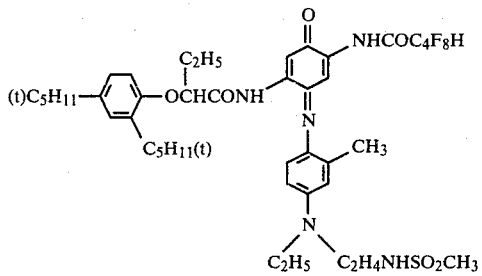

0.1 g of the dye having the above-described structure was dissolved in a mixture of 3 ml of dibutyl phthalate and 5 ml of ethyl acetate. The resulting solution was emulsified in 10 g of 10% gelatin containing 1 ml of 1% sodium dodecylbenzenesulfonate. The thus emulsified dispersion was then mixed with 10 g of 10% gelatin, and the resulting mixture was applied to a paper base in which both faces were laminated with polyethylene, and dried (Sample E).

33.5 mg of the compound I-5 of the present invention was added in case of producing the above-described emulsified dispersion and the resulting emulsified dispersion was applied by the same manner as in Sample E to produce Sample F. Futher, Sample G was produced by adding 20 mg of α-tocopherol known as an agent for preventing fading of dyes and applying the resulting emulsion by the same manner as in Sample E. The application was carried out so as to be 50 mg/m² of the dye. These Samples E to G were subjected to a fading test for 48 hours by a xenon tester having 200,000 luxes of the illuminance equipped with an ultraviolet ray cut filter C-40 produced by Fuji Photo Film Co. The results are shown in Table II.

TABLE II

|  | Initial Density | Density after Testing |
|---|---|---|
| Sample E | 0.80 | 0.33 |
| Sample F | 0.80 | 0.62 |
| Sample G | 0.79 | 0.43 |

The measurement was carried out by a Macbeth densitometer RD514 (Red filter of Status AA filter).

It has been understood from these results that the compound I-5 of the present invention shows an excellent effect for preventing light fading. Further, the compound of the present invention is very effective to cyan dyes, though effective compounds having an effect for preventing light fading for cyan dyes have not been known.

EXAMPLE 3

10 g of the magenta coupler: 1-(2,4,6-trichlorophenyl)-3-[(2-chloro-5-tetradecanamido)anilino]-2-pyrazoline-5-one was dissolved in a mixture of 30 ml of tricresyl phosphate, 5 ml of dimethylformamide and 15 ml of ethyl acetate, and the resulting solution was emulsified in 80 g of 10% gelatin containing 8 ml of a 1% aqueous solution of sodium dodecylbenzenesulfonate.

The thus emulsified dispersion was then mixed with 145 g (7 g as Ag) of a green-sensitive silver bromochloride emulsion (Br: 50% by mol), and sodium dodecylbenzenesulfonate was added as an application assistant thereto. The emulsion was applied to a paper base in which both faces were laminated with polyethylene. (Sample H). The amount of the coupler was 400 mg/m².

2.6 g of the compound I-6 of the present invention was added in case of producing the above-described emulsified dispersion and the resulting dispersion was applied by the same manner as in Sample H to produce Sample I. Further, Sample J was produced by adding 2.2 g of 2,5-di-tert-octylhydroquinone known as the agent for preventing light fading of dyes and applying by the same manner as in Sample H. These samples were exposed to light at 1,000 luxes for 1 second and then processed with the following treating solutions.

| Developer solution: | | |
|---|---|---|
| Benzyl alcohol | 15 | ml |
| Diethylenetriamine pentaacetic acid | 5 | g |
| KBr | 0.4 | g |
| Na₂SO₃ | 5 | g |
| Na₂CO₃ | 30 | g |
| Hydroxylamine sulfate | 2 | g |
| 4-Amino-3-methyl-N-ethyl-N-β-(methanesulfonamido)ethylaniline . 3/2H₂SO₄ . H₂O | 4.5 | g |
| Water to make | 1,000 | ml |
|  | pH 10.1 | |
| Bleach-fix solution: | | |
| Ammonium thiosulfate (70 wt %) | 150 | ml |
| Na₂SO₃ | 5 | g |
| Na(Fe(EDTA)) | 40 | g |
| EDTA | 4 | g |
| Water to make | 1,000 | ml |
|  | pH 6.8 | |

| Processing Step | Temperature (°C.) | Time |
|---|---|---|
| Developing solution | 33 | 3 min 30 sec |
| Bleach-fix solution | 33 | 1 min 30 sec |
| Water wash | 28–35 | 3 min |

Each of the resulting samples on which dye images were formed was exposed to sunlight for 2 weeks through an ultraviolet ray absorption filter C-40 produced by Fuji Photo Film Co. which cut below 400 nm. The results are shown in Table III. The measurement was carried out by a Macbeth densitometer type RD-514 (Status AA filter) and density variation of the part having 2.0 of the initial density was measured.

TABLE III

|  | Density of Part Having 2.0 of Initial Density after Testing | Dye Residual Ratio (%) |
|---|---|---|
| Sample H | 0.89 | 44.5 |
| Sample I | 1.49 | 74.5 |
| Sample J | 1.08 | 54 |

Dye residual ratio = (Density after fading/2.0) × 100.

It has been understood from these results that the compound I-6 of the present invention is an effective agent for preventing fading.

EXAMPLE 4

50 mg of the compound having the following structure and 500 mg of polycarbonate: Lexan 145 (produced by General Electric Co.) were dissolved in 100 ml of dichloromethane, and the resulting solution was applied to a glass plate by a spinner.

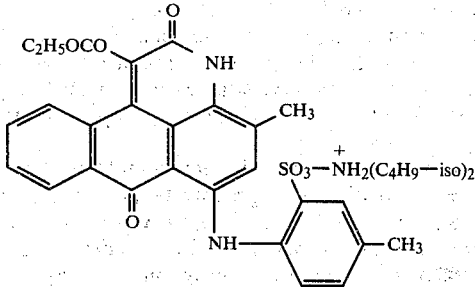

This film had 5.5 μm of the thickness and a magenta hue. (Sample K)

A sample was produced similarly by adding 5 mg of the compound I-4 to the above-described solution. (Sample L)

The fading test was carried out by exposing these two samples to sunlight for 1 month. The results are shown in the following table.

TABLE IV

| Sample | Dye Residual Ratio (%) |
|---|---|
| K | 50 |
| L | 85 |

It is apparent that Sample L according to the invention has excellent fastness to light.

While the invention has been described in detail and with reference to specific embodiments thereof, it will be apparent to one skilled in the art that various changes and modifications can be made therein without departing from the spirit and scope thereof.

What is claimed is:

1. A method for stabilizing photographically useful dye substrates having an absorption maximum in the range of from about 300 nm to 800 nm to light which comprises making at least one complex represented by the formula (I) coexist with the organic substrate materials in an amount effective to stabilize said organic substrate material;

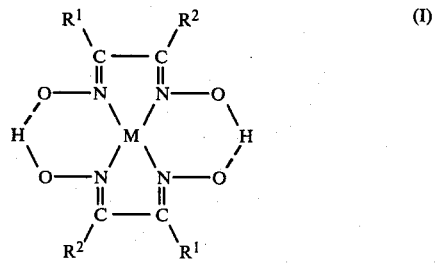

wherein M represents copper, cobalt, nickel, palladium or platinum, and $R^1$ and $R^2$ independently represent a hydrogen atom, an alkyl group, an aryl group, an acyl group, an N-alkylcarbamoyl group, an N-arylcarbamoyl group, or an N-alkylsulfamoyl group, an N-arylsulfamoyl group, an alkoxycarbonyl group or an aryloxycarbonyl group.

2. The method of claim 1, wherein said organic substrate material is at least one dye selected from the group consisting of anthraquinone dyes, quinonimine dyes, azo dyes, methine dyes, polymethine dyes, indoamine dyes, indophenol dyes, formazan dyes and whitening agents which improve background whiteness.

3. The method of claim 2, wherein said dyes are produced from dye-forming couplers, DDR couplers, DRR compounds, dye developing agents or silver dye bleach dyes.

4. The method of claim 3, wherein said dye-forming coupler is a yellow dye-forming coupler selected from benzoylacetanilides and α-pivalylacetanilides, a magenta dye-forming coupler selected from 5-pyrazolones, indazolones, pyrazolinobenzimidazoles, pyrazolo-s-triazoles and cyanoacetylcumarones, or a cyan dye-forming coupler selected from phenols and naphthols.

5. The method of claim 1, wherein said complex is represented by the formula (IA):

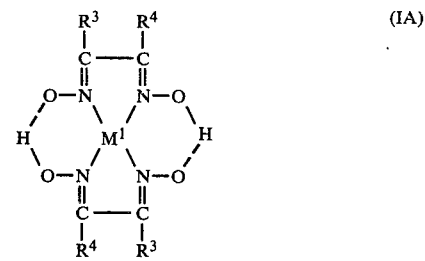

wherein $M^1$ represents copper, cobalt, nickel, palladium or platinum, and $R^1$ and $R^2$ independently represent a hydrogen atom, an alkyl group, an aryl group, an N-alkylcarbamoyl group and an N-arylcarbamoyl group.

6. An element comprising an organic substrate material which is stabilized against the action of light and comprises the combination of at least one of a complex with at least one organic substrate material in an amount effective to stabilize the element to light, where said complex is represented by the formula (I):

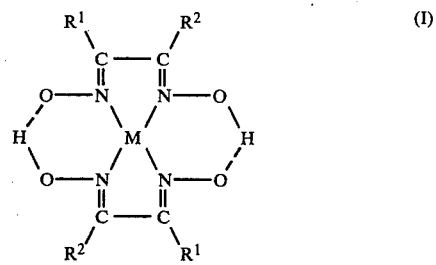

wherein M represents copper, cobalt, nickel, palladium or platinum, and $R^1$ and $R^2$ independently represent a hydrogen atom, an alkyl group, an aryl group, an acyl group, an N-alkylcarbamoyl group, an N-arylcarbamoyl group, or an N-alkylsulfamoyl group, an N-arylsulfamoyl group, an alkoxycarbonyl group or an aryloxycarbonyl group, said organic substrate material is a photographically useful dye having an absorption maximum in the range of from about 300 nm to 800 nm, and said complex not adversely affecting color hue or color purity of the photographically useful dye.

7. A color photographic material comprising at least one exposed and developed silver halide emulsion which contains a photographic dye image, wherein at least one layer containing a photographic dye image or an adjacent layer contains a complex of the formula (I) in an amount effective to stabilize the photographic dye image:

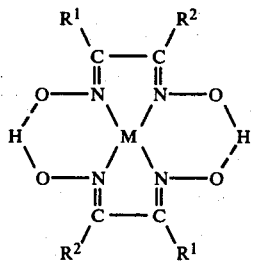
(I)

wherein M represents copper, cobalt, nickel, palladium or platinum, and $R^1$ and $R^2$ independently represent a hydrogen atom, an alkyl group, an aryl group, an acyl group, an N-alkylcarbamoyl group, an N-arylcarbamoyl group, or an N-alkylsulfamoyl group, an N-arylsulfamoyl group, an alkoxycarbonyl group or an aryloxycarbonyl group.

8. The method of claim 1 wherein said light is electromagnetic radiation having a wavelength less than about 800 nm and includes ultraviolet rays of a wavelength shorter than about 400 nm, visible radiation of from about 400 nm to about 700 nm and infrared rays of from about 700 nm to about 800 nm.

* * * * *